US006532624B1

United States Patent
Yang

(10) Patent No.: US 6,532,624 B1
(45) Date of Patent: Mar. 18, 2003

(54) BRAKE CASTER

(76) Inventor: Yao-Wei Yang, P.O. Box 90, Tainan City (TW)

( * ) Notice: Subject to any disclaimer, the term of this patent is extended or adjusted under 35 U.S.C. 154(b) by 0 days.

(21) Appl. No.: 10/035,135

(22) Filed: Jan. 4, 2002

(51) Int. Cl.[7] .............................................. B60B 33/00
(52) U.S. Cl. ...................... 16/35 R; 16/35 D; 188/1.12
(58) Field of Search ............................. 16/35 R, 35 D, 16/18 R; 188/1.12; 108/177, 189; D8/375

(56) References Cited

U.S. PATENT DOCUMENTS

| | | | | |
|---|---|---|---|---|
| 1,633,638 A | * | 6/1927 | Jarvis et al. ............... | 16/35 R |
| 4,941,552 A | * | 7/1990 | Screen ...................... | 188/1.12 |
| 5,632,360 A | * | 5/1997 | Melara ...................... | 188/1.12 |
| 5,675,864 A | * | 10/1997 | Chou ......................... | 16/35 R |
| 5,988,323 A | * | 11/1999 | Chu ............................ | 188/1.12 |
| 6,360,851 B1 | * | 3/2002 | Yang ........................... | 188/1.12 |

* cited by examiner

Primary Examiner—Anthony Knight
Assistant Examiner—Doug Hutton

(57) ABSTRACT

A brake caster in the invention mainly includes a wheel holder, a spindle, a stop seat, a brake seat, a stop plate and two wheel bodies. The paddle of the brake seat is capable of being depressed to make the top push-face of the brake seat rotated upwardly to push the stop seat upwardly so that the external teeth of the stop seat are engaged to the internal teeth of the two wheel bodies to brake the two wheel bodies not to move; at the same time, the engagement end of the stop plate is engaged to the plurality of engagement grooves disposed at the bottom of the spindle to lock the spindle not to swivel so as to achieve actual braking and positioning effects in the two wheel bodies and the spindle.

2 Claims, 5 Drawing Sheets

BRAKE CASTER

BACKGROUND OF THE INVENTION

1. Field of the Invention

This invention relates to a brake caster, particularly to one capable of braking two wheel bodies not to move and engaging a spindle not to swivel by the depressing of a paddle of a brake seat so as to achieve actual braking and positioning effects in the two wheel bodies and the spindle.

2. Description of the Prior Art

Generally speaking, a known conventional caster, as shown in FIG. 1, has a wheel holder 10 whose upper portion is extended through by a spindle 11 capable of being fixedly screwed to the wheel holder 10 with a nut 12 and whose lower portion is combined with a wheel body 14 by a pivot 13. However, the known caster can move or slide at any time without limitation because it is not equipped with any devices to provide braking and positioning functions. To this disadvantage, an improved caster is developed with a braking device to increase its braking function. However, such a braking device can only brake the wheel body 14 without the ability to limit the swiveling of the spindle 11; therefore, the improved caster is unable to achieve a complete stop, i.e. it still allows the spindle 11 to swivel even if the wheel body 14 is braked.

SUMMARY OF THE INVENTION

The main purpose of the invention is to offer a brake caster capable of braking two wheel bodies not to move and engaging a spindle not to swivel so as to achieve actual braking and positioning effects in the two wheel bodies and the spindle.

The main feature of the invention is to provide a brake caster mainly including:

a wheel holder having a spindle seat disposed at a lower portion, the spindle seat having a through hole disposed therein and at least one positioning plate disposed at one sidewall, each of the two positioning plates having an axial hole;

spindle capable of being extended through the through hole of the spindle seat of the wheel holder and having a lower portion provided with a plurality of engagement grooves and an upper portion screwed with a nut;

a stop seat capable of being disposed below the wheel holder and having two opposite ring bodies, each of the two ring bodies having a plurality of external teeth disposed at an upper portion and a through hole formed at a center, a fixing base disposed between the two ring bodies and having at least one recess disposed at an upper portion and an inclined plane disposed at a bottom;

a brake seat capable of being disposed below the stop seat and having one end provided with a top push-face and the other end provided with a paddle, an axial hole disposed below the top push-face;

a stop plate capable of being firmly fixed at a bottom of the brake seat and having one end formed to be an engagement end; and, two wheel bodies capable of being oppositely disposed below the wheel holder and connected by a pivot, two chambers respectively disposed at two opposite inner surfaces of the two wheel bodies and each having a plurality of internal teeth disposed around an inner sidewall surface thereof.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
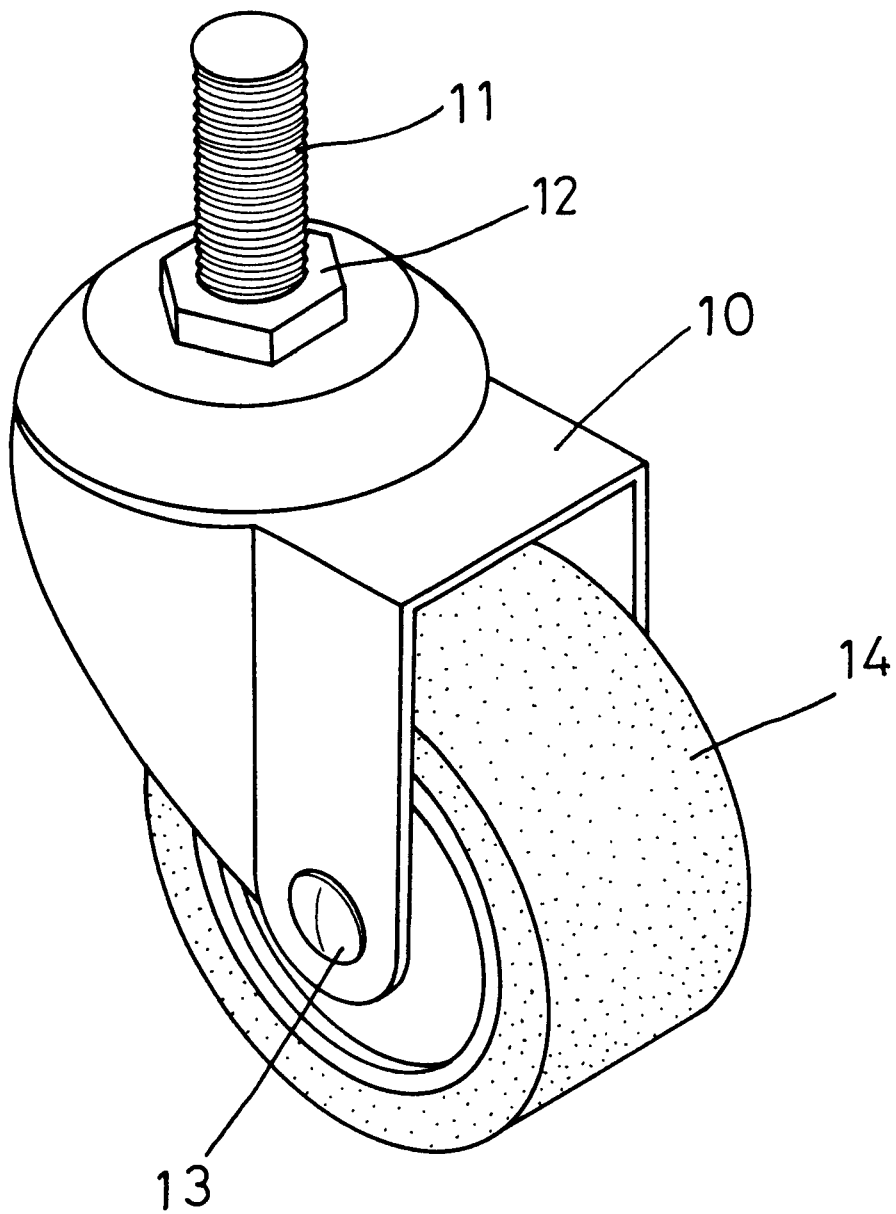
FIG. 1 is a perspective view of a known conventional caster.
Figure 2:
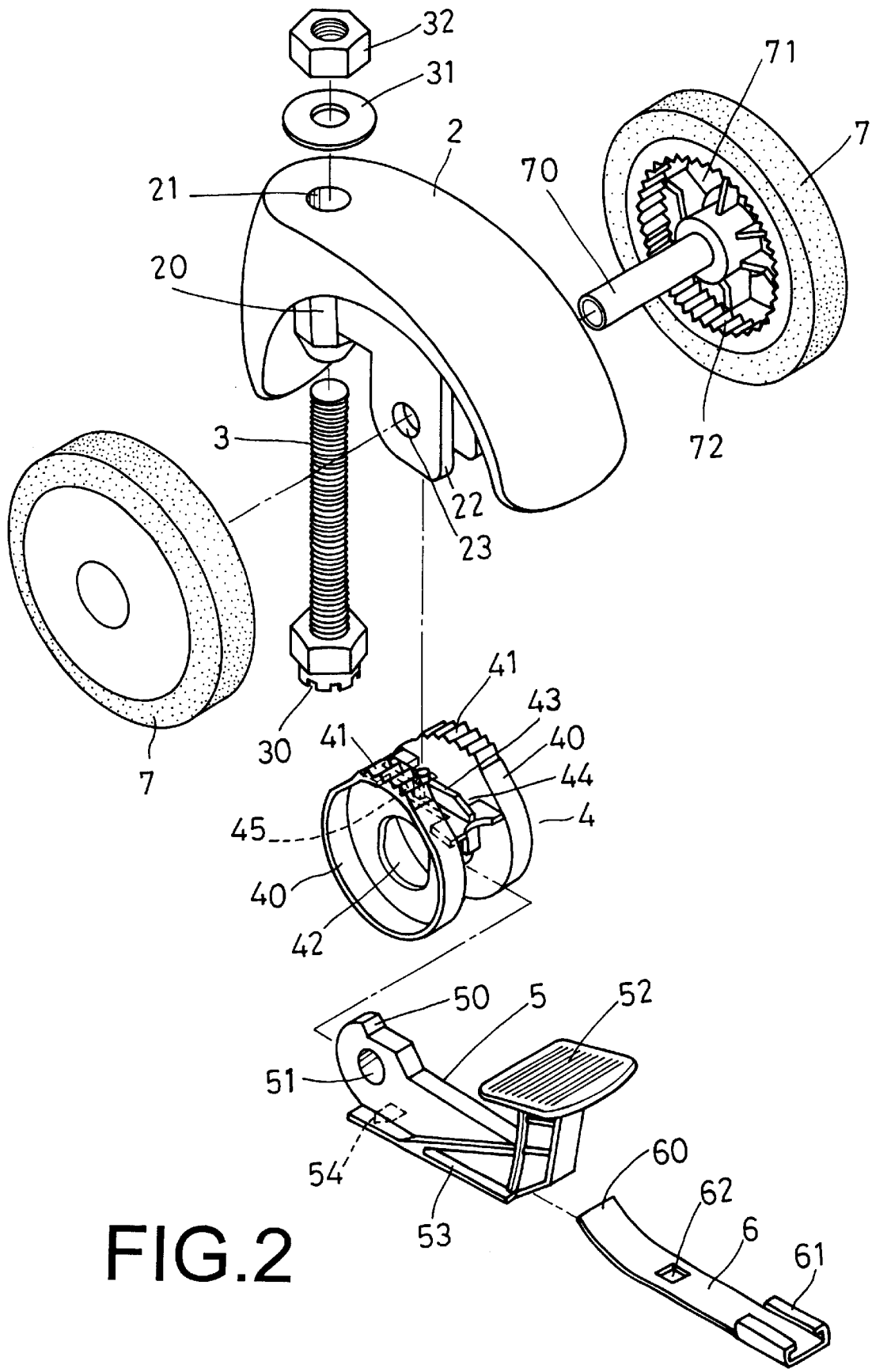
FIG. 2 is an exploded perspective view of a brake caster in the present invention.
Figure 3:
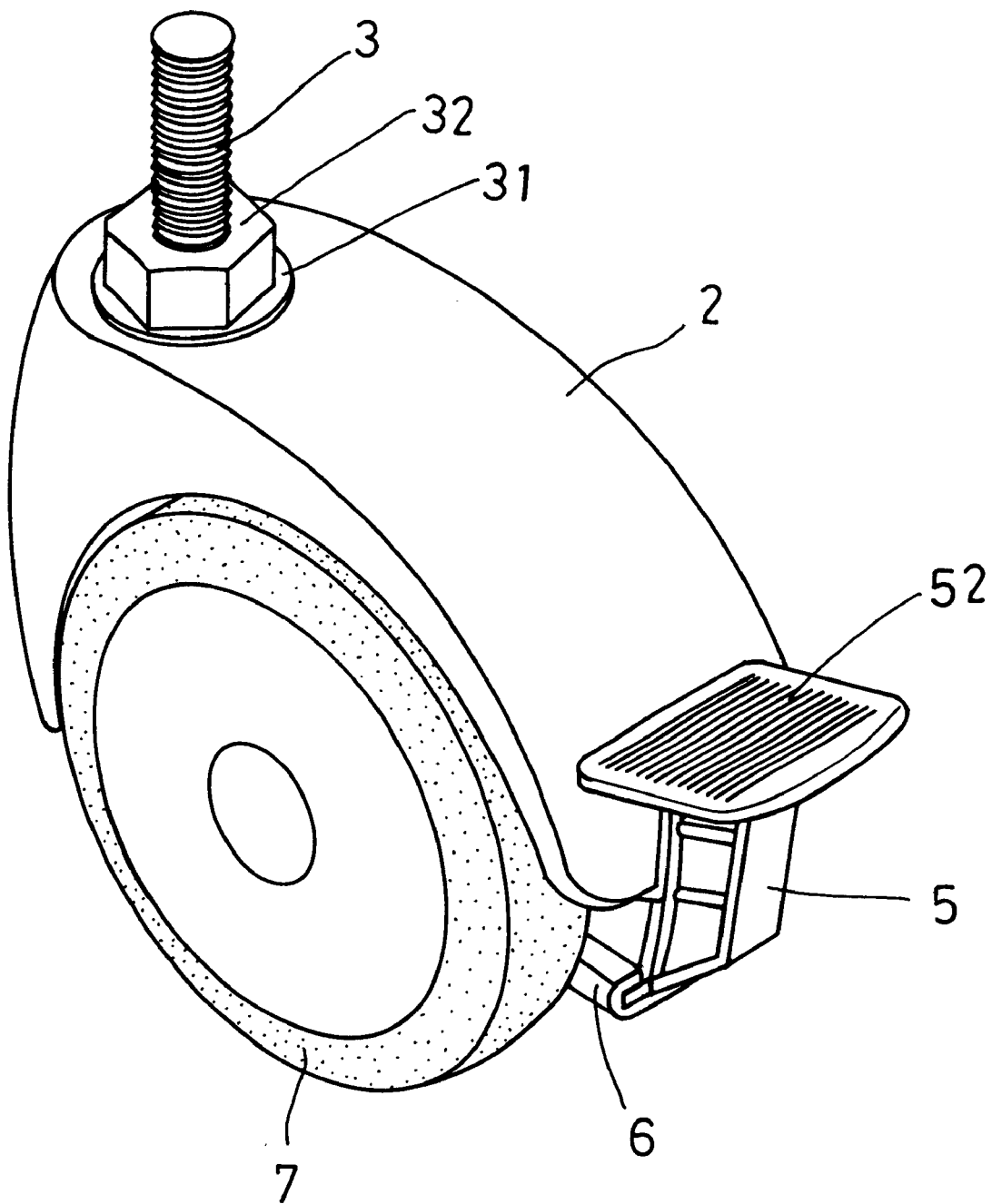
FIG. 3 is a perspective view of the brake caster in the present invention.
Figure 4:
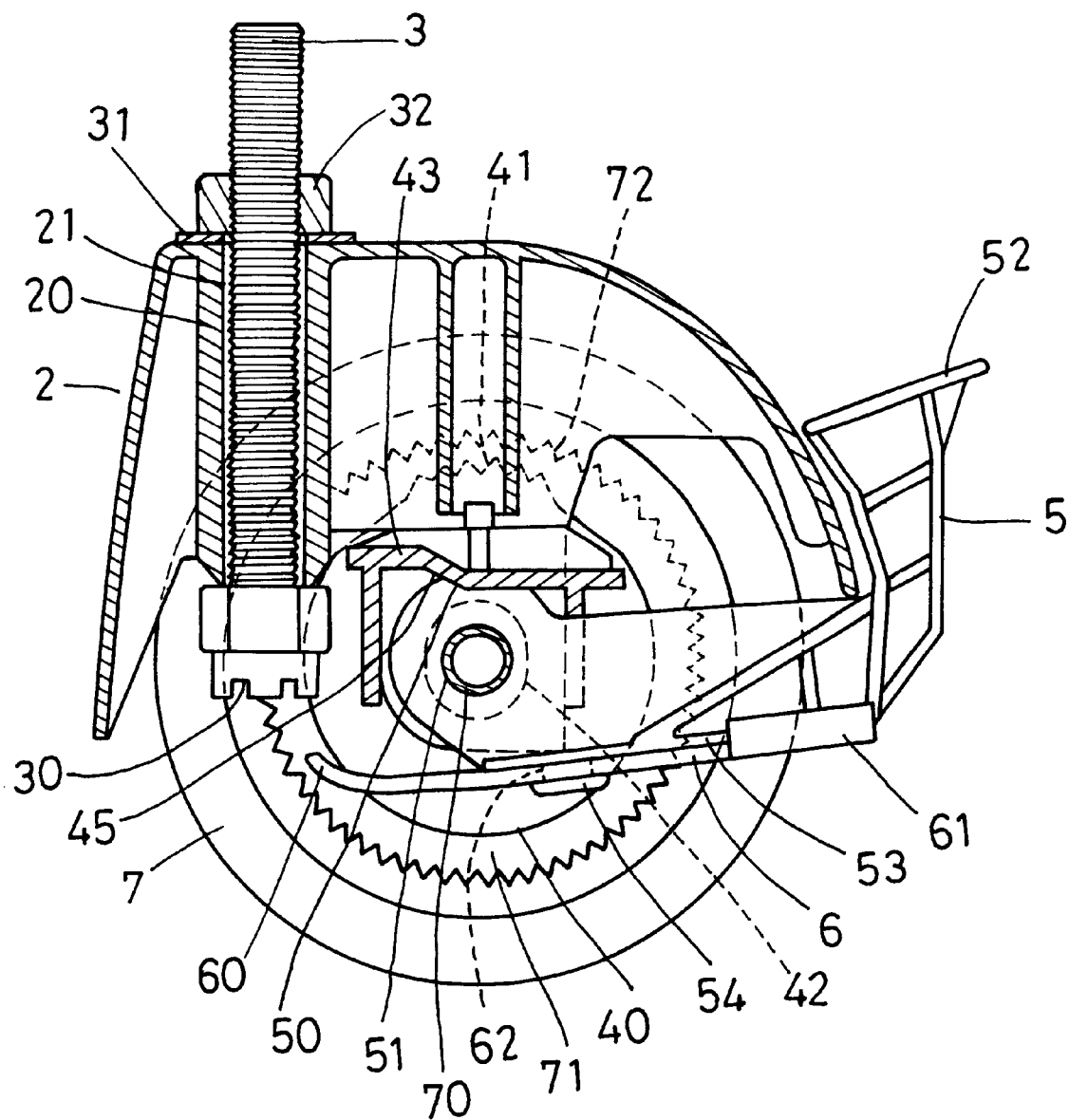
FIG. 4 is a cross-sectional view of the brake caster in the present not being in a braked condition; and, FIG. 5 is a cross-sectional view of the brake caster in the present being in a braked condition.

A preferred embodiment of a brake caster in the present invention, as shown in FIGS. 2, 3 and 4, mainly includes a wheel holder 2, a spindle 3, a stop seat 4, a brake seat 5, a stop plate 6 and two wheel bodies 7.

The wheel holder 2 has a spindle seat 20 disposed at a lower portion. The spindle seat 20 has a through hole 21 disposed therein and two opposite positioning plates 22. Each of the two positioning plates has an axial hole 23.

The spindle 3 capable of being extended through the through hole 21 of the spindle seat 20 has a lower portion provided with a plurality of engagement grooves 30 as well as an upper portion extended through by a washer 31 and screwed with a nut 32.

The stop seat 4 capable of being disposed below the wheel holder 2 has two opposite ring bodies 40. Each of the two ring bodies 40 has a plurality of external teeth 41 disposed at an upper portion and a through hole 42 formed at a center. A fixing base 43 disposed between the two ring bodies 40 has two recesses 44 respectively disposed at both sides and an inclined plane 45 disposed at a bottom.

The brake seat 5 capable of being disposed between the two ring bodies 40 of the stop seat 4 has one end provided with a top push-face 50 and the other end provided with a paddle 52. An axial hole 51 is disposed below the top push-face 50. The brake seat 5 has a bottom whose both sides are respectively provided with a lip 53 and whose surface has an insert block 54 provided with an inclined plane being protruded thereon.

The stop plate 6 capable of being mounted at the bottom of the brake seat 5 has one end formed to be an engagement end 60 in curved shape and the other end formed to be a binding member 61 provided with two oppositely folded ends. An insert hole 62 is disposed in the stop plate 6.

The two wheel bodies 7 capable of being oppositely disposed below the wheel holder 2 are connected by a pivot 70. Two chambers 71 are respectively disposed at two opposite inner surfaces of the two wheel bodies 7 and each of the two chambers 71 has a plurality of internal teeth 72 disposed around an inner sidewall surface thereof.

In assembling, referring to FIGS. 2, 3 and 4, firstly extend the spindle 3 from the lower portion of the wheel holder 2 through the through hole 21 of the spindle seat 20 out of an upper portion of the wheel holder 2. After placing the washer 31 to the upper portion of the spindle 3, use the nut 32 to firmly screw the spindle 3 together with the wheel holder 2.

Secondly, insert the two opposite positioning plates 22 respectively into the two recesses 44 of the stop seat 4 to make the axial holes 23 of the two positioning plates 22 aligned with the through hole 42 of the stop seat 4.

Thirdly, push the engagement end 60 of the stop plate 6 from one end of the brake seat 5 provided with the paddle 52 forward with a close contact between the engagement end 60 of the stop plate 6 and the bottom of the brake seat 5 to make the lips 53 of the brake seat 5 inserted into the binding member 61 of the stop plate 6 and to make the insert block 54 of the brake seat 5 engaged to the insert hole 62 of the stop plate 6 with a protruded portion of the insert block 54 of the brake seat 5 being punched to the bottom of the stop plate 6, by which the stop plate 6 can be firmly fixed at the bottom of the brake seat 5 and the engagement end 60 of the stop plate 6 is protruded out of a rear portion of the brake seat 5.

Fourthly, place the other end of the brake seat 5 provided with the top push-face 20 below the fixing base 43 that is disposed between the two ring bodies 40 of the stop seat 4 and further insert it between the two positioning plates 22 of the wheel holder 2 to make the top push-face 50 of the brake seat 5 attached against the inclined plane 45 that is disposed at the bottom of the fixing base 43 and to make the axial hole 51 of the brake seat 5 aligned with the axial holes 23 of the two positioning plates 22 and the through hole 42 of the stop seat 4, by which the paddle 52 of the brake seat 5 is located in front of the wheel holder 2.

Finally, place the two wheel bodies 7 oppositely at the both sides of the lower portion of the wheel holder 2 and extend the pivot 70 through the through hole 42 of the stop seat 4, the axial holes 23 of the two positioning plates 22 of the wheel holder 2 and the axial hole 51 of the brake seat 5 to connect the wheel holder 2, the stop seat 4, the brake seat 5 and two wheel bodies 7 in position and to make the two ring bodies 40 of the stop seat 4 respectively accommodated within the chambers 71 of the two wheel bodies 7, by which the brake caster of the present invention is assembled all together.

Figure 5:
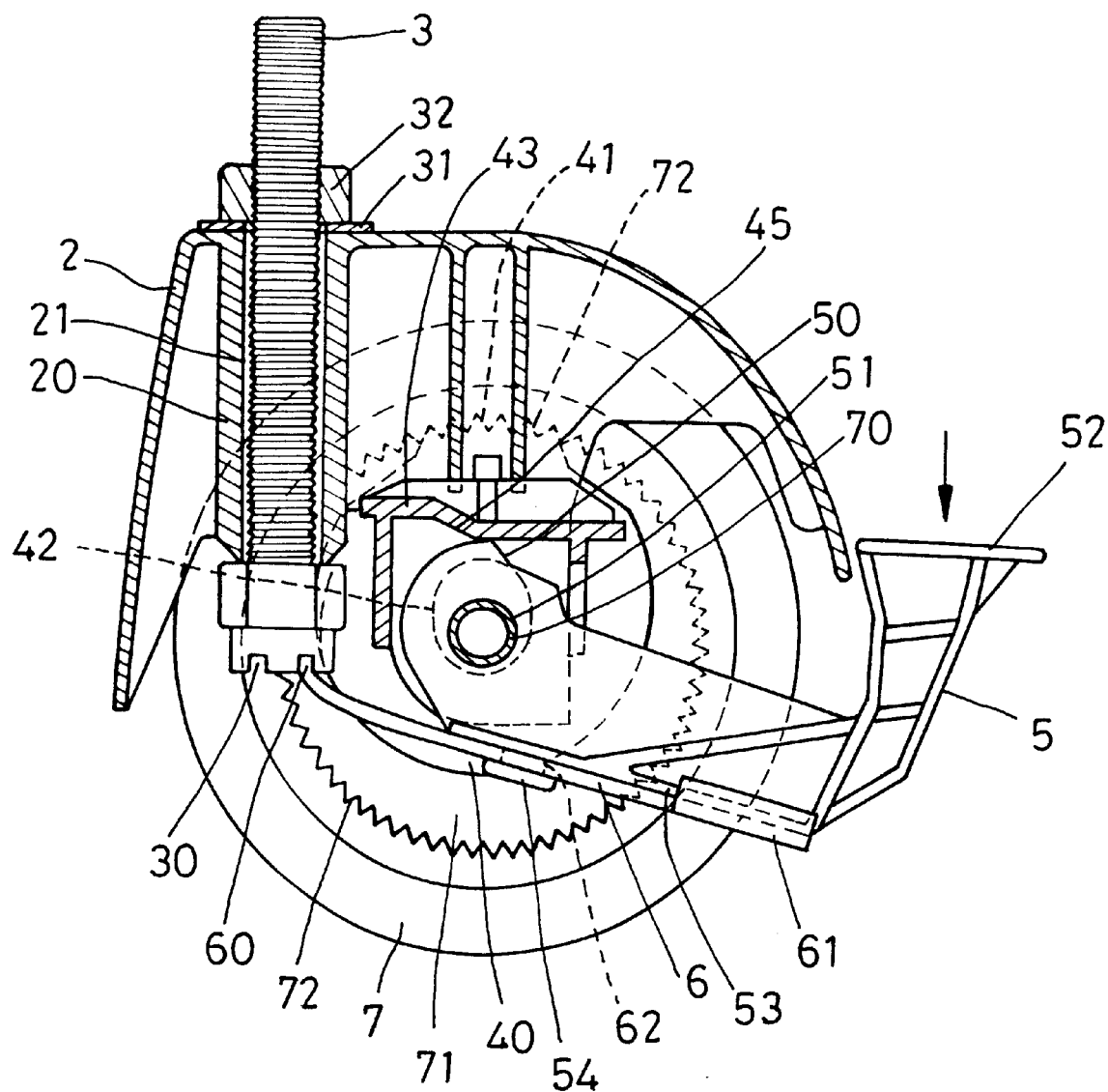

In using, referring to FIGS. 4 and 5, when the brake caster of the present invention is not in a braked condition, the paddle 52 of the brake seat 5 is kept in a horizontal position and the top push-face 50 of the brake seat 5 is attached against the inclined plane 45 of the stop seat 4, by which the two ring bodies 40 respectively disposed at the both sides of the stop seat 4 are located in the central positions of the two chambers 71 of the two wheel bodies 7 and the external teeth 41 disposed at the upper portion of the two ring bodies 40 of the stop seat 4 are not engaged with the internal teeth 72 disposed inside the two chambers 71 of the two wheel bodies 7 so that the two wheel bodies 7 are capable of making free rotation and the spindle 3 is also capable of making free swiveling without any limitation.

When the brake caster of the present invention is in a braked condition, as shown in FIG. 5, the paddle 52 of the brake seat 5 is depressed to make the top push-face 50 of the brake seat 5 rotate upwardly to push the stop seat 4 upwardly along the inclined plane 45 of the stop seat 4, by which the external teeth 41 disposed at the upper portion of the two ring bodies 40 of the stop seat 4 are engaged to the internal teeth 72 disposed inside the two chambers 71 of the two wheel bodies 7 so that the two wheel bodies 7 under the engagement of the stop seat 4 are locked in a position limiting its rotation of moving forward or backward. Moreover, the depressing of the paddle 52 of the brake seat 5 allows one end of the stop plate 6 provided with the binding member 61 to move downwardly and the other end of the stop plate 6 provided with the engagement end 60 to rotate upwardly to be engaged into the plurality of engagement grooves 30 disposed at the bottom of the spindle 3, by which the spindle 3 is locked in a position limiting its swiveling. Therefore, only the depressing of the paddle 52 of the brake seat 5 is capable of braking the two wheel bodies 7 not to move and engaging the spindle 3 not to swivel at the same time so as to achieve actual braking and positioning effects in the two wheel bodies 7 and the spindle 3.

While the preferred embodiment of the invention has been described above, it will be recognized and understood that various modifications may be made therein and the appended claims are intended to cover all such modifications that may fall within the spirit and scope of the invention.

What is claimed is:

1. A brake caster comprising:

a wheel holder having a spindle seat disposed at a lower portion, said spindle seat having a through hole disposed therein and at least one positioning plate disposed at one sidewall, each of said at least one positioning plates having an axial hole;

a spindle capable of being extended through said through hole of said spindle seat of said wheel holder and having a lower portion provided with a plurality of engagement grooves and an upper portion screwed with a nut;

a stop seat capable of being disposed below said wheel holder and having two opposite ring bodies, each of said two ring bodies having a plurality of external teeth disposed at an upper portion and a through hole formed at a center, a fixing base disposed between said two ring bodies and having at least one recess and an inclined plane;

a brake seat capable of being disposed below said stop seat and having one end provided with a top push-face and the other end provided with a paddle, an axial hole disposed below said top push-face;

a stop plate capable of being firmly fixed at a bottom of said brake seat and having one end formed to be an engagement end; and, two wheel bodies capable of being oppositely disposed below said wheel holder and connected by a pivot, two chambers respectively disposed at two opposite inner surfaces of said two wheel bodies and each having a plurality of internal teeth disposed around an inner sidewall surface thereof; and, whereby said paddle of said brake seat is capable of being depressed to make said top push-face of said brake seat rotate upwardly to push said stop seat upwardly so that said external teeth of said stop seat are engaged to said internal teeth of said two wheel bodies to brake said two wheel bodies not to move; at the same time, said engagement end of said stop plate is engaged to said plurality of engagement grooves disposed at said bottom of said spindle to lock said spindle not to swivel so as to achieve actual braking and positioning effects in said two wheel bodies and said spindle.

2. The brake caster as claimed in claim 1, wherein said brake seat has a bottom whose sides are respectively provided with a lip and whose surface has an insert block provided with an inclined plane protruded thereon; a binding member is disposed at another end of said stop plate for being inserted by said lips of said brake seat; an insert hole is disposed in said stop plate for being engaged by said insert block of said brake seat and a protruded portion of said insert block of said brake seat is capable of being punched to be firmly fixed at an bottom of said stop plate.

* * * * *